United States Patent
Ochs

(10) Patent No.: US 7,504,467 B2
(45) Date of Patent: Mar. 17, 2009

(54) PROCESS FOR PREPARING ORGANOPOLYSILOXANES HAVING TRIORGANOSILOXY GROUPS

(75) Inventor: Christian Ochs, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 11/403,569

(22) Filed: Apr. 13, 2006

(65) Prior Publication Data

US 2006/0241269 A1     Oct. 26, 2006

(30) Foreign Application Priority Data

Apr. 21, 2005   (DE) .................. 10 2005 018 629

(51) Int. Cl.
C08G 77/06     (2006.01)
C08G 77/04     (2006.01)
C08G 77/12     (2006.01)

(52) U.S. Cl. .............................. 528/15; 528/31; 528/33

(58) Field of Classification Search .................. 528/33, 528/15

See application file for complete search history.

(56) References Cited

U.S. PATENT DOCUMENTS

| | | | |
|---|---|---|---|
| 3,179,678 A | | 4/1965 | Daughenbaugh |
| 3,271,360 A | | 9/1966 | Williams |
| 3,328,448 A | | 6/1967 | Barnes et al. |
| 3,504,006 A | * | 3/1970 | Modic ........................ 556/459 |
| 4,267,298 A | * | 5/1981 | Bluestein ..................... 528/34 |
| 4,870,149 A | * | 9/1989 | Hara et al. .................... 528/15 |
| 4,921,926 A | * | 5/1990 | Motegi et al. ................. 528/17 |
| 4,975,510 A | * | 12/1990 | Wegehaupt et al. ............ 528/21 |
| 5,049,617 A | * | 9/1991 | Yoshioka et al. ............. 525/104 |
| 5,098,981 A | * | 3/1992 | Saho et al. .................... 528/32 |
| 5,118,723 A | * | 6/1992 | Irifune et al. ................. 522/99 |
| 5,272,225 A | * | 12/1993 | Ogawa et al. ............... 525/477 |
| 5,576,110 A | * | 11/1996 | Lin et al. .................... 428/447 |
| 5,981,670 A | | 11/1999 | Itoh et al. |
| 6,150,488 A | * | 11/2000 | Martin ......................... 528/34 |
| 6,214,961 B1 | * | 4/2001 | Aoki ........................... 528/21 |
| 6,284,906 B1 | * | 9/2001 | Paulasaari et al. ........... 556/451 |
| 2003/0139287 A1 | | 7/2003 | Deforth et al. |
| 2004/0127668 A1 | | 7/2004 | Rubinsztajn et al. |

FOREIGN PATENT DOCUMENTS

| | | |
|---|---|---|
| DE | 1 246 251 B | 8/1967 |
| DE | 1 259 886 B | 2/1968 |
| JP | 60-54392 A | 3/1985 |
| JP | 03263431 A * | 11/1991 |
| JP | 6-329804 A | 11/1994 |
| JP | 09-104749 A | 4/1997 |
| JP | 10-237174 A | 9/1998 |
| JP | 2001-151889 A | 6/2001 |
| JP | 2002-154917 A | 5/2002 |
| JP | 2003-82102 A | 3/2003 |

OTHER PUBLICATIONS

Uchida et al., J. Am. Chem. Soc. 1990, 112, 7077-7079.*
Guo Ping Cai et al: "Synthesis Of Polymethyl (Trimethylsiloxy)Siloxane By Anionic Ring-Opening Polymerization Of 1,3,5-Trimethyl-1,3,5-Tris(Trimethylsiloxy)Cyclotrisiloxane", Macromolecules, ACS, Washington, DC, US, vol. 33, No. 17, Aug. 22, 2000. pp. 6310-6314.
Patent Abstracts of Japan, vol. 1995, No. 02, Mar. 31, 1995.
G. H. Barnes et al: "The Preparation Of Organosilanols Via Metal-Catalyzed Reaction Of Organosilicon Hydrides With Water", J. Org. Chem., vol. 31, 1966, pp. 885-887.
Polymer Preprints, "Formation of Siloxane Bonds Via New Condensation Process", 2004, 45 (1), p. 635-636.
English Abstract corresponding to JP 60-54392 A 1985.
English Abstract corresponding to JP 09-104749 A 1997.
English Abstract corresponding to JP 2001-151889 A 2001.
English Abstract corresponding to JP 2002-154917 A 2002.
English Abstract corresponding to JP 2003-82102 A 2003.

* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

A process for preparing organopolysiloxanes bearing triorganosiloxy groups of defined structure involves reacting, in a first step, organopolysiloxanes having SiH groups with water in the presence of a metal of transition group VIII or compounds thereof as a catalyst, optionally in the presence of cocatalysts, to provide Si—OH group-containing intermediates, and, in a second step, reacting the intermediates bearing SiOH groups with silanes which have a group reactive toward SiOH groups. The reaction proceeds rapidly in high yield and with few byproducts.

20 Claims, No Drawings

PROCESS FOR PREPARING ORGANOPOLYSILOXANES HAVING TRIORGANOSILOXY GROUPS

BACKGROUND OF THE INVENTION

1. Field of the Invention

The invention relates to a process for preparing organopolysiloxanes having triorganosiloxy groups, especially linear organopolysiloxanes functionalized in a comb-like manner with triorganosiloxy groups, particularly with vinyldimethylsiloxy groups.

2. Background Art

As is commonly known, organosiloxane copolymers can be prepared in the simplest case by a condensation reaction between two reactants containing silanol groups. However, the reaction profile is not specific, since the homopolymerization of the reactants with themselves also takes place in parallel to the desired heterocondensation process. As a result, a random mixture of the desired polymer and the homopolymerization products is therefore obtained. The classical condensation process is therefore unsuitable for selectively forming linear organopolysiloxanes functionalized in a comb-like manner with organosiloxy groups.

The same applies for the introduction of T units via equilibration processes, since the distribution of the T units is also purely random. The reaction products are therefore a mixture of more or less highly branched and partly bridged polymers rather than a polymer with a defined uniform structure.

In the literature, a multitude of so-called "nonhydrolytic" reactions have therefore been proposed, with which selective formation of Si—O—Si bonds is possible. Among the functionalization routes detailed, however, for various reasons such as raw material availability, reaction selectivity, reaction yield, reaction time or specific plant requirements, only a few are suitable for the preparation of the target compounds on the industrial scale.

One example is the acid- or alkali-catalyzed dehydrocondensation between SiH-containing organopolysiloxanes and SiOH-containing organosilicon compounds. However, the reaction is often accompanied to a not inconsiderable degree, by equilibrations and the partial fragmentation of the polymer backbone of the reactant, so that the resulting products are nonuniform with regard to their structure. In addition, the restricted stability and industrial availability of the silanols required for the synthesis of the abovementioned target compounds constitute an additional disadvantage, so that the analogous transition metal-catalyzed dehydrocondensation based on noble metal catalysts is also unable to offer any industrially satisfactory alternative. In the latter process, an additional disadvantage is that the noble metal catalysts used, because they are recoverable only with a considerable degree of cost and inconvenience, if at all, remain in the product, which can lead to undesired effects in the further processing or use of the products.

A possible alternative is offered by the approach taught by Deforth and Mignani in US published application 2003/0139287. Here, boron-catalyzed crosslinking of SiH-containing organopolysiloxanes with silanol-terminated polydimethylsiloxanes with elimination of hydrogen leads to silicone elastomers. In principle, the process should also be applicable to the synthesis of the target compounds specified at the outset. The preferred boron catalysts, especially tris(pentafluorophenyl)boron, have, however not yet become industrially widespread and are accordingly expensive. Moreover, these catalysts also remain in the reaction product, which is undesired for the reasons previously mentioned.

A similar route is described by Rubinsztajn and Cella in U.S. published application 2004/0127668 and Polymer Preprints 2004, 45(1), p. 635. Here, SiH-containing silanes or siloxanes are reacted with one another under Lewis acid catalysis with elimination of a volatile hydrocarbon radical and simultaneous formation of an Si—O—Si bond. However, the process has the disadvantage that the catalysts used, for example $FeCl_3$, $AlCl_3$, $ZnCl_2$, $ZnBr_2$ or $BF_3$, are either insoluble in siloxanes and thus have a low activity, or else, for example the tris(pentafluorophenyl)-boron used with preference, are very expensive and likewise remain in the reaction product at the end of the reaction.

SUMMARY OF THE INVENTION

It is therefore an object of the invention to provide a process which does not have the abovementioned disadvantages and which allows the selective synthesis of linear organopolysiloxanes functionalized in a comb-like manner with triorganosiloxy groups, especially vinyldimethylsiloxy groups. These and other objects are achieved by the invention, wherein organopolysiloxanes bearing silicon-bonded hydrogen are converted to silanol group-containing organopolysiloxanes by reaction with water in the presence of a Group III metal-containing catalyst, and the silanol groups are then reacted with silanes reactive therewith.

DETAILED DESCRIPTION OF THE PREFERRED EMBODIMENT(S)

The invention thus provides a process for preparing organopolysiloxanes which have triorganosiloxy groups and are of the general formula

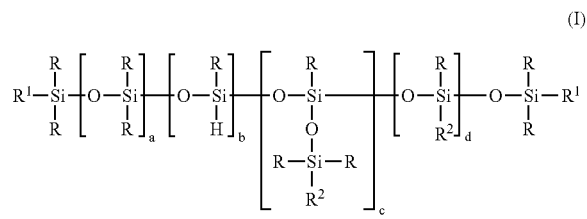

(I)

where R is a monovalent, SiC-bonded, optionally substituted hydrocarbon radical having from 1 to 18 carbon atoms, $R^1$ is R or $R^3$, and $R^2$ is R or $R^3$, preferably $R^3$, where $R^3$ is a monovalent, SiC-bonded hydrocarbon radical having a terminal aliphatic carbon-carbon double bond and from 2 to 8 carbon atoms per radical, a is an integer from 0 to 1000, preferably from 80 to 500, more preferably from 100 to 200, b is an integer from 0 to 100, preferably from 0 to 50, more preferably from 0 to 10, more preferably 0, c is an integer from 1 to 100, preferably from 1 to 10, more preferably from 1 to 6, more preferably from 2 to 4, d is an integer from 0 to 100, preferably from 0 to 10, more preferably 0, by (a) in a first step, reacting organopolysiloxanes (A) which have SiH groups and are of the general formula

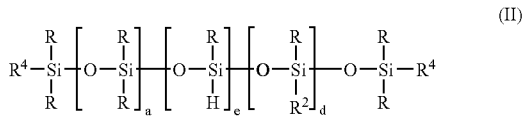

(II)

where
a is the sum of b+c and is an integer from 1 to 200, preferably from 1 to 60, more preferably from 1 to 16, more preferably from 1 to 4,
$R^4$ is R or a hydrogen atom,
and R, a, b, c and d are each as defined above,
in the presence of catalyst(s) (B) selected from the group of the metals of transition group VIII of the Periodic Table and their compounds,
and optionally in the presence of cocatalyst(s) (K),
with water (C),
to give intermediates of the general formula

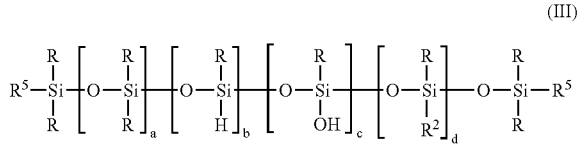

(III)

where
$R^5$ is R or an HO group,
and R, a, b, c and d are each as defined above, and,
(b) in a second step, reacting the intermediates which have SiOH groups and are obtained in this way with silanes (D) which have a group reactive toward SiOH groups.

In the context of this invention, the general formulae (I), (II) and (III) should be understood such that the units specified in each case with the indices a, b, c and d in the formulae (I) and (III), or a, e and d in the formula (II), can be distributed in the organopolysiloxane molecule in any manner, for example as a block or randomly.

Examples of R radicals are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, and the α- and the β-phenylethyl radicals.

Examples of substituted R radicals are haloalkyl radicals such as the 3,3,3-trifluoro-n-propyl radical, the 2,2,2,2',2',2'-hexafluoroisopropyl radical, the heptafluoroisopropyl radical, and haloaryl radicals such as the o-, m- and p-chlorophenyl radicals.

The R radical is preferably a monovalent hydrocarbon radical having from 1 to 6 carbon atoms, particular preference being given to the methyl radical and the phenyl radical.

Examples of $R^3$ radicals are alkenyl radicals such as the vinyl, 5-hexenyl, cyclohexenyl, 1-propenyl, allyl, 3-butenyl and 4-pentenyl radical. The $R^3$ radical is preferably the vinyl radical.

In process step (a), the organopolysiloxanes (A) having SiH groups which are used are preferably those of the general formulae

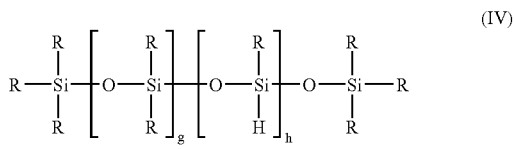

(IV)

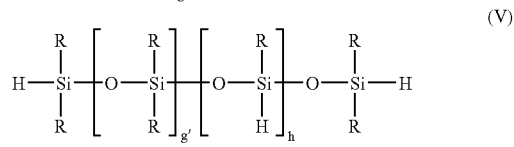

(V)

where
g is from 40 to 1000, preferably from 80 to 500, more preferably from 100 to 200,
g' is from 38 to 1000, preferably from 78 to 500, more preferably from 98 to 200,
h is from 1 to 6, preferably from 2 to 4, and
R is as defined above.

The organopolysiloxanes (A) preferably have an average viscosity of from 10 to 100,000 mm²/s, more preferably from 25 to 10,000 mm²/s, most preferably from 50 to 1000 mm²/s, at 25° C., are commercial products or may be prepared by processes common in silicone chemistry, and may be used individually or as mixtures.

The metals of transition group VIII of the Periodic Table or their compounds used as component (B) in reaction step (a) are preferably metals of the platinum group or their compounds, preferably Ru, Rh, Ir, Pd and Pt and their compounds. More than one catalyst may be used. The catalysts (B) may be used as solids, as solutions in water or dissolved in any organic solvents, or bonded to support materials. Preference is given to catalysts (B) bonded to support materials. Suitable support materials are in principle all inorganic or organic polymers useful for this purpose, for example $SiO_2$, $Al_2O_3$, aluminas, activated carbon or organic resins. The catalyst support material is preferably activated carbon or $Al_2O_3$, in which case component (B) is preferably palladium/activated carbon, palladium/$Al_2O_3$ and ruthenium/activated carbon, especially palladium/activated carbon.

The amount of the catalyst (B) used depends upon the number of SiH groups present in the organopolysiloxane (A). Catalyst (B) is used preferably in amounts of from 10 to 10,000 ppm, more preferably from 20 to 1000 ppm, most preferably from 50 to 500 ppm, calculated as the metallic element and based on the total weight of the organopolysiloxanes (A) used, and are commercial products or can be prepared by processes common in organometallic chemistry. The catalyst bonded to a support material is preferably removed by filtration after the reaction has ended or at the end of the process according to the invention, and optionally used again or recycled.

The cocatalysts (K) which are optionally used are protic, hydridic or redox-labile compounds. Examples of suitable cocatalysts (K) are organic acids such as formic acid, acetic acid, oxalic acid, citric acid and ascorbic acid, and also low molecular weight organosilicon hydrides such as trimethylsilane, triethylsilane and tetramethyldisiloxane. The low molecular weight organosilicon hydrides preferably have 1 to 5 silicon atoms, more preferably 1-3 silicon atoms, and most preferaly 1 or 2 silicon atoms.

Preferred cocatalysts (K) are formic acid, acetic acid, oxalic acid, citric acid, ascorbic acid, triethylsilane and tetramethyldisiloxane, preference being given to formic acid, oxalic acid, ascorbic acid, triethylsilane and tetramethyldisiloxane, particular preference to formic acid, triethylsilane and tetramethyldisiloxane.

The amount of the cocatalyst (K) used depends upon the amount of catalyst (B) used. The cocatalyst (K) is used preferably in amounts of from 25 to 1000 mol %, more preferably from 50 to 500 mol %, most preferably from 100 to 250 mol %, based on 100 mol % of metallic element in the catalyst (B).

In the inventive process, preference is given to using cocatalysts (K) when the organopolysiloxanes (A) are those of the general formulae IV and V; preference is also given to using cocatalysts (K) when the organopolysiloxanes (A) used are those of the general formula IV, since this can considerably shorten the reaction time, especially when the lower-SiH-functionality compounds of the general formula IV are used.

In the process of the invention, component (C) may be any type of water, preference being given to demineralized water, distilled water and purified water (aqua purificata), with particular preference given to demineralized water.

The amount of component (C) which is used depends upon the number of SiH groups present in the organopolysiloxane (A). Preference is given to using component (C) in an equimolar amount or in excess based on the SiH groups present in the organopolysiloxane (A). The amount of water used is preferably from 100 to 200 mol %, more preferably from 100 to 150 mol %, in particular from 100 to 120 mol %, per 100 mol % of SiH groups present in the organopolysiloxane (II). In reaction step (a) of the reaction with water, the process is preferably carried out in a temperature range of from −10° C. to +150° C., more preferably from +10° C. to +100° C., most preferably from +25° C. to +80° C.

Reaction step (a) of the process according to the invention may, for example be carried out with or without solvent (E), to homogenize or to lower the viscosity of the reaction mixture, preference being given to the presence of solvent. If solvent (E) is present, it is preferably polar, organic solvent which increases the compatibility of water toward the organopolysiloxane phase, but does not itself react with the SiH groups present in the organopolysiloxanes (A) or with the groups which are reactive toward SiOH groups and are present in the silane (D). Examples of suitable solvents are tetrahydrofuran, dioxane, dimethoxyethane, preference being given to tetrahydrofuran or dioxane. When solvent (E) is used, it is preferably present in amounts of from 1 to 500 parts by weight, more preferably from 5 to 200 parts by weight, and most preferably from 10 to 100 parts by weight, per 100 parts by weight of the organopolysiloxane (A) used.

After reaction step (a) of the process has ended, the resulting reaction products can be purified and/or isolated by any process steps known to date. If desired, it is possible, after the reaction, to remove, for example, volatile components and any solvent by distillation, optionally under reduced pressure, and also to remove the catalyst bonded to a support material by filtration. The components (A), (B) and optionally (K) and optionally (E) used in accordance with the invention in reaction step (a) may each be one type of the component or a mixture of at least two types of the particular component.

In the second process step (b), the silanes (D) which have a group reactive toward SiOH groups are preferably those of the general formulae

where
X is a hydrogen atom, a chlorine atom or a radical of the formula —OH, —OR, or —NR$^6_2$, preferably a chlorine atom or a radical of the formula —OR,
where R$^6$ is R or a hydrogen atom,
R and R$^2$ are each as defined above, and
k is equal to 1, 2 or 3.

Component (D) preferably comprises silanes of the general formulae (VI) or (VII) in which k is 1, R is a methyl radical and R$^2$ is a vinyl radical. Particular preference is given to vinyldimethylchlorosilane, vinyldimethylethoxysilane and vinyldimethyldisilazane. The silanes (D) are commercial products or they can be prepared by processes common in silicone chemistry. The component (D) may be one type of the component or else a mixture of at least two types of the particular component.

The amount of the component (D) depends upon the number of SiOH groups present in the intermediate of the general formula (III). Component (D) is preferably used in an equimolar amount or in excess based on the SiOH groups present in the intermediate of the general formula (III). The amount of the component (D) used is preferably from 100 to 150 mol %, more preferably from 100 to 120 mol %, in particular from 100 to 110 mol %, per 100 mol % of the SiOH groups present in the intermediate of the general formula (III).

The organopolysiloxanes having triorganosiloxy groups which are obtained are preferably those of the general formula

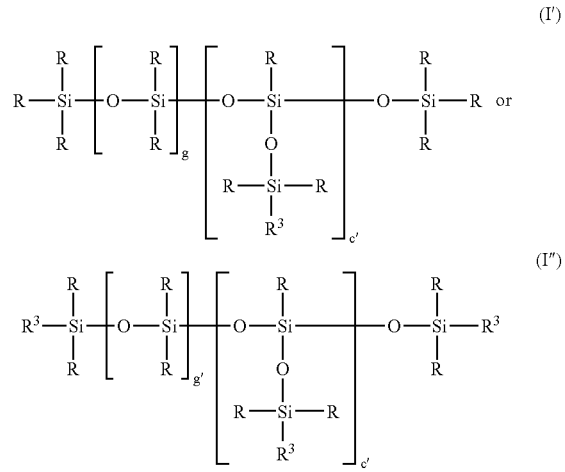

where R, R$^3$, g and g' are each as defined above, and
c' is from 1 to 6, preferably from 2 to 4.

It is also possible in reaction step (b) of the process for further "reaction promoting assistants" (F) which promote the reaction, to be present. Examples of suitable assistants are auxiliary bases such as alkali metal or alkaline earth metal salts of inorganic or organic acids, for example Na$_3$PO$_4$, Na$_2$HPO$_4$, NaH$_2$PO$_4$, Na$_2$CO$_3$, NaHCO$_3$ or NaOAc) and organic amines (for example triethylamine, ethyldiisopropylamine, pyridine, imidazole, DABCO or DBN), and also condensation catalysts such as organic acids (for example formic acid or acetic acid), partial phosphoric and phosphonic esters and mixtures thereof (for example dibutyl phosphate), transition metals of transition group I to VII and their compounds, and compounds of Al, Sn or Bi.

The use of assistants (F), their type and amount depends, in the manner known to those skilled in the art, on the nature of the silanes (D) used in reaction step (b) and the resulting reaction mechanism. For example, when chlorosilanes of the general formula (VI) are used, the use of one of the auxiliary bases mentioned in an amount of from 100 to 120 mol % per 100 mol % of the silane (D) used is beneficial. In contrast, for example, the use of disilazanes of the general formula (VII) generally requires the use of from 10 to 10,000 ppm by weight, based on the amount of component (D), of a corresponding chlorosilane or of an inorganic or organic acid, for example HCl or p-toluenesulfonic acid. In addition, when alkoxysilanes of the general formula (VI) are used, reaction step (b) can be accelerated by using from 10 to 10,000 ppm by weight, based on the amount of component (D), of an organic amine.

The second reaction step (b) is preferably carried out in a temperature range of from −20 to +200° C., more preferably from 0 to 150° C., more preferably from 30 to 120° C., and can be carried out with or without solvent (G). The solvent may be of the type (E) or comprise solvents which are different from (E).

If solvents (G) are present, for example to lower the viscosity, for the purpose of better stirrability or to homogenize the reaction mixture, they are preferably inert solvents, i.e. those which cannot react with SiOH groups present in the intermediates of the general formula (III) or with groups which are reactive toward SiOH groups and are present in the silane (D). Examples of suitable solvents are tetrahydrofuran, dioxane, toluene, acetone and dimethoxyethane, preference being given to tetrahydrofuran.

It is also possible in the process according to the invention to use further substances (H) which do not take part directly in the reaction in process steps (a) and (b) and do not adversely affect the course of the reaction.

Examples of such further substances (H) are emulsifiers, phase transfer catalysts, preservatives, antimicrobial substances, for example bactericides, fungicides or algicides, odorants, odor-inhibiting or odor-reducing substances, antifoams, rheology regulators, dyes, pigments, redox stabilizers, flame retardants, light stabilizers and heat stabilizers. Preference is given to not using any further substances (H) in the process according to the invention. The components used in reaction step (b) may each be one type of the component or a mixture of at least two types of the particular component.

After reaction step (b) has ended, the resulting reaction products can be isolated or purified by any process steps known to date. If desired, it is possible after the reaction, for example, to remove volatile components and any solvent used by distillation, optionally under reduced pressure, and also catalyst bonded to a support material by filtration.

The process according to the invention may be carried out as a two-stage reaction with intermediate removal of the catalyst (B) and/or isolation of the reaction products, or as a two-stage one-pot reaction. In addition, the process may be carried out as a homogeneous one-phase reaction, as a multiphase reaction or in dispersion, for example micro- or macroemulsion. Preference is given to the performance as a homogeneous one-phase reaction.

When the process is carried out as a two-phase reaction, which is not preferred, very good homogenization of the mutually immiscible phases and the creation of a large inner reaction surface has to be ensured, for example by generating average particle sizes of <500 μm. The intensive mixing of the reaction phases can in principle be effected by all mixing systems known from the prior art, for example stirrers of all types, high-speed stirrers, for example those obtainable under the Ultra-Turrax® brand or similar dissolver system, by means of ultrasound probes or baths, or with static or moving mixing elements, for example in the case of a continuous reaction.

When the process is carried out in dispersion, which is likewise not preferred, emulsifiers or surfactants, for instance nonionic, anionic, cationic or amphoteric emulsifiers, may accordingly be present, in which case the dispersion can be prepared in any manner known to those skilled in the art.

In all of the processes, the components used are mixed and allowed to react with one another in a known manner. The components in reaction step (a) may be mixed with one another, fed to the reaction and/or reacted in any sequence. In the case of a very exothermic reaction, however, preference is given to metering component (C), optionally in a mixture with component (E), to a mixture consisting of components (A), (B), optionally (K) and optionally (E), and also optionally (H). In reaction step (b), preference is given to metering component (D), optionally in a mixture with component (G), to the intermediate of the general formula (III) and component (F), which may optionally be present in a mixture with components (E), (G) and/or (H).

The process is preferably carried out at a pressure of the surrounding atmosphere, i.e., for instance, at from 900 to 1100 hPa, but it may also be carried out at higher and lower pressures. The process may be carried out batchwise, semicontinuously or fully continuously in reactor systems suitable therefor, for example batch reactors, batch reactor batteries, loop reactors, flow tubes, tubular reactors, microreactors, centrifugal pumps and any combinations thereof.

The process according to the invention may additionally be followed by any further process steps, by means of which the desired properties of the organopolysiloxanes obtained by the process according to the invention can be adjusted. The performance of the process steps is in principle in line with the prior art and proceeds in the manner known to those skilled in the art.

The process of the invention has the advantage that it is simple and inexpensive to perform. A particular advantage of the process is that it proceeds quantitatively, extremely selectively and virtually without side reaction. The desired linear organopolysiloxanes functionalized in a comb-like manner with triorganosiloxy groups, especially vinyldimethylsiloxy groups, are therefore obtained with good yield and in high purity.

A further advantage of the process according to the invention is that the catalyst (B) used in reaction step (a) can be removed virtually completely by filtration in a simple manner, and no undesired amounts of catalyst thus remain in the reaction product. In addition, the recovered catalyst can be worked up, reused and/or fed back to the process. The process is accordingly sustainably environmentally compatible and sparing of resources. The process has the additionally advantage that it is usable universally, and is equally suitable for a continuous and a batchwise process.

In the examples described below, all specifications of parts and percentages, unless stated otherwise, are based on weight. In addition, all viscosity data relate to a temperature of 20° C. Unless stated otherwise, the examples below are carried out at a pressure of the surrounding atmosphere, i.e. at about 1000 hPa, and room temperature, i.e. at about 20° C., or at a temperature which is established when the reactants are combined at room temperature without additional heating or cooling.

EXAMPLE 1

2 g of water and 100 g of a linear siloxane consisting of trimethylsiloxy, dimethylsiloxy and hydromethylsiloxy units, having an active hydrogen content of 0.085%, and a viscosity of 95 mm$^2$/s, are dissolved in 70 g of tetrahydrofuran and admixed with 0.25 g of palladium/activated carbon (Pd/C, 10% by weight of palladium). The mixture is heated to 70° C. and stirred at this temperature for 5 hours, in the course of which evolution of hydrogen takes place. Subsequently, all volatile constituents are removed by distillation at 80° C. at full vacuum and the catalyst is removed by filtration. A colorless, clear product having a viscosity of 130 mm$^2$/s and a silanol group content of 84.9 mmol/100 g is obtained. NMR spectroscopy confirms the quantitative formation of silanol groups bonded laterally to the siloxane main chain (29 Si NMR: δ=approx. −56 to −58 ppm).

100 g of the siloxane thus obtained and 11.14 g (93.5 mmol) of triethylamine are dissolved in 50 g of tetrahydrofuran. Subsequently, the reaction mixture is cooled to 15° C. and admixed with 9.68 g (89.25 mmol) of trimethylchlorosilane with good stirring. After the addition has ended, the reaction mixture is heated to reflux temperature (approx. 70° C.) and stirred at this temperature for 60 minutes. Subsequently, all volatile constituents are removed by distillation at 80° C. in full vacuum, and also the ammonium salt by filtration. A colorless clear oil having a viscosity of 145 mm$^2$/s is obtained. NMR confirms the formation of a product which has trimethylsiloxy groups bonded laterally to the siloxane main chain (29 Si NMR: δ=approx. −65.5 to −66.5 ppm), and which is free of polymer chains bridged via T units (29 Si NMR: δ=approx. −67 to −69 ppm).

EXAMPLE 2

4.6 g of water and 400 g of a linear siloxane consisting of trimethylsiloxy, dimethylsiloxy and hydromethylsiloxy units, having an active hydrogen content of 0.051%, and a viscosity of 250 mm$^2$/s, are dissolved in 280 g of tetrahydrofuran and admixed with 1.04 g of palladium/activated carbon (Pd/C, 10% by weight of palladium) and 0.104 g of triethylsilane. The mixture is stirred at room temperature, in the course of which the reaction mixture warms slowly to approx. 30° C. with evolution of hydrogen. After the slightly exothermic reaction has abated, the mixture is stirred at 30° C. for a further one hour, subsequently heated to reflux temperature (approx. 70° C.) and allowed to react at this temperature for a further four hours. Subsequently, all volatile constituents are removed by distillation at 80° C. in full vacuum and the catalyst is removed by filtration. A colorless, clear product having a viscosity of 290 mm$^2$/s and a silanol group content of 50.9 mmol/100 g is obtained. NMR confirms the quantitative formation of silanol groups bonded laterally to the siloxane main chain.

100 g of the siloxane thus obtained and 16.24 g (160.5 mmol) of triethylamine are dissolved in 100 g of tetrahydrofuran. Subsequently, the reaction mixture is cooled to 10° C. and admixed with 14.76 g (122.3 mmol) of vinyldimethylchlorosilane with good stirring. After the addition has ended, the reaction mixture is heated to reflux temperature (approx. 75° C.) and stirred at this temperature for 60 minutes. Subsequently, all volatile constituents are removed by distillation at 80° C. in full vacuum, and also the ammonium salt by filtration. A colorless clear oil having a viscosity of 315 mm$^2$/s and a vinyl group content of 51 mmol/100 g is obtained.

EXAMPLE 3

13.4 g of water and 625 g of a linear siloxane consisting of hydrodimethylsiloxy, dimethylsiloxy and hydromethylsiloxy units, having an active hydrogen content of 0.084%, and a viscosity of 230 mm$^2$/s are dissolved in 560 g of tetrahydrofuran and admixed with 2.09 g of palladium/activated carbon (Pd/C, 10% by weight of palladium). The mixture is stirred at room temperature, in the course of which the reaction mixture warms slowly to approx. 30° C. with evolution of hydrogen. After the slightly exothermic reaction has abated, the mixture is stirred at 30° C. for a further one hour, subsequently heated to reflux temperature (approx. 70° C.) and allowed to react at this temperature for a further two hours. Subsequently, all volatile constituents are removed by distillation at 80° C. at full vacuum and the catalyst is removed by filtration. A colorless, clear product having a viscosity of 285 mm$^2$/s and a silanol group content of 84.1 mmol/100 g is obtained. NMR spectroscopy confirms the quantitative formation of silanol groups bonded terminally and laterally to the siloxane main chain.

600 g of the siloxane thus obtained and 64 g (632.5 mmol) of triethylamine are dissolved in 300 g of tetrahydrofuran. Subsequently, the reaction mixture is cooled to 10° C. and admixed with 58.18 g (483 mmol) of vinyldimethylchlorosilane with good stirring. After the addition has ended, the reaction mixture is heated to reflux temperature (approx. 80° C.) and stirred at this temperature for 60 minutes. Subsequently, all volatile constituents are removed by distillation at 100° C. in full vacuum, and also the ammonium salt by filtration. A colorless clear oil having a viscosity of 325 mm$^2$/s and a vinyl group content of 83.9 mmol/100 g is obtained.

EXAMPLE 4

5.3 g of water and 250 g of a linear siloxane consisting of hydrodimethylsiloxy, dimethylsiloxy and hydromethylsiloxy units, having an active hydrogen content of 0.084%, and a viscosity of 230 mm$^2$/s, are dissolved in 225 g of tetrahydrofuran and admixed with 0.85 g of palladium/activated carbon (Pd/C, 10% by weight of palladium) and 37 mg of formic acid. The mixture is stirred at room temperature, in the course of which the reaction mixture warms slowly to approx. 30° C. with evolution of hydrogen. After the slightly exothermic reaction has abated, the mixture is stirred at 30° C. for a further one hour, subsequently heated to reflux temperature (approx. 70° C.) and allowed to react at this temperature for a further two hours. Subsequently, all volatile constituents are removed by distillation at 80° C. at full vacuum and the catalyst is removed by filtration. A colorless, clear product having a viscosity of 294 mm$^2$/s and a silanol group content of 84.0 mmol/100 g is obtained. NMR confirms the quantitative formation of silanol groups bonded terminally and laterally to the siloxane main chain.

200 g of the siloxane thus obtained are admixed with 31.1 g (168.1 mmol) of bis(vinyldimethyl)silazane and 0.03 g of vinyldimethylchlorosilane, and heated to 120° C. The mixture is stirred at this temperature for 4 hours. Subsequently, 3.5 g of water are added and all volatile constituents are removed in full vacuum by distillation at 120° C. A colorless clear oil having a viscosity of 315 mm$^2$/s and a vinyl group content of 83.5 mmol/100 g is obtained.

COMPARATIVE EXAMPLE 110 g of a linear siloxane consisting of trimethylsiloxy, dimethylsiloxy and hydromethylsiloxy units, having an active hydrogen content of 0.028%, and a viscosity of 430 mm$^2$/s, are cooled to 0° C. and admixed at this temperature with 0.121 g of 10% aqueous KOH and 4.712 g (46.2 mmol) of vinyldimethylsilanol. The mixture is stirred at this temperature for 3 hours, heated to 100° C. and allowed to react for a further 2 hours. Subsequently, 0.014 g of acetic acid (100%) is added and all volatile constituents are removed by distillation at 130° C. under full vacuum. After filtration, a clear colorless product having a viscosity of 150 mm$^2$/s is obtained. NMR spectroscopy of the reaction product confirms the formation of a mixture of polymers consisting of trimethylsiloxy, vinyldimethylsiloxy, dimethylsiloxy and (cyclo-trisiloxanyl)dimethylsiloxy units. In contrast, the formation of the desired (vinyldimethylsiloxy)methylsiloxy units is observed only to a minor degree.

EXAMPLE 5

1.1 g of water and 100 g of a linear siloxane consisting of trimethylsiloxy, dimethylsiloxy and hydromethylsiloxy units, having an active hydrogen content of 0.051%, and a viscosity of 245 mm$^2$/s, are dissolved in 70 g of tetrahydrofuran and admixed with 0.26 g of palladium/activated carbon (Pd/C, 10% by weight of palladium). In addition, an equimolar amount (based on the amount of the metallic palladium in the Pd/C) of cocatalyst according to table 1 is added to the reaction mixture. The reaction mixture is stirred at room temperature, in the course of which it warms slowly to approx. 25 to 30° C. with evolution of hydrogen. Subsequently, it is heated to reflux temperature (approx. 70° C.) and allowed to react at this temperature for a further 2 hours, in the course of which the reaction conversion is monitored by NMR spectroscopy with respect to SiH (see table 1). Thereafter, all volatile constituents are removed by distillation at 80° C. under full vacuum and the catalyst is removed by filtration. A colorless, clear product with silanol groups bonded laterally to the siloxane main chain is obtained.

In each case 100 g of the siloxane obtained according to 5b, 5d, 5e or 5f and 16.24 g (160.5 mmol) of triethylamine are dissolved in 100 g of tetrahydrofuran. Subsequently, the reaction mixture is cooled to 10° C. and admixed with 14.76 g (122.3 mmol) of vinyldimethylchlorosilane with good stirring. After the addition has ended, the reaction mixture is heated to reflux temperature (approx. 75° C.) and stirred at this temperature for 60 minutes. Subsequently, all volatile constituents are removed by distillation at 80° C. under full vacuum, and the ammonium salt by filtration. A colorless clear oil having a viscosity of, 310 mm$^2$/s on average, and a vinyl group content of, 50.9 mmol/100 g on average, is obtained.

EXAMPLE 6

1.7 g of water and 100 g of a linear siloxane consisting of trimethylsiloxy, dimethylsiloxy and hydromethylsiloxy units, having an active hydrogen content of 0.085%, and a viscosity of 95 mm$^2$/s, are dissolved in 65 g of tetrahydrofuran and admixed with 0.125 g of palladium/activated carbon (Pd/C, 10% by weight of palladium) and 28 mg of formic acid. The mixture is heated to 70° C. and stirred at this temperature for 3 hours, in the course of which evolution of hydrogen takes place. Subsequently, all volatile constituents are removed by distillation at 80° C. under full vacuum and the catalyst is removed by filtration. A colorless, clear product having a viscosity of 126 mm$^2$/s and a silanol group content of 84.7 mmol/100 g is obtained. NMR spectroscopy confirms the quantitative formation of silanol groups bonded laterally to the siloxane main chain.

100 g of the siloxane thus obtained are mixed with 14.19 g (122.3 mmol) of vinyldimethylmethoxysilane and 0.9 g (12.2 mmol) of propylenediamine. Subsequently, the reaction mixture is heated to 120° C. and stirred at this temperature for 3 hours. Thereafter, all volatile constituents are removed by distillation at 120° C. under full vacuum. A colorless clear oil having a viscosity of 130 mm$^2$/s and a vinyl group content of 84.1 mmol/100 g is obtained.

While embodiments of the invention have been illustrated and described, it is not intended that these embodiments

TABLE 1

|  | 5a | 5b | 5c | 5d | 5e | 5f |
|---|---|---|---|---|---|---|
| Cocatalyst | — | Formic Acid | Acetic acid | Oxalic acid dihydrate | Triethylsilane | Tetramethyldisiloxane |
| Amount (mg) | — | 11.3 | 14.6 | 30.8 | 26.0 | 16.4 |
| Conversion after 1 h/30° C. | 34% | 87% | 49% | 72% | 62% | 83% |
| Conversion after 1 h/70° C. | 65% | 100% | 91% | 100% | 85% | 100% |
| Conversion after 2 h/70° C. | 87% | 100% | 98% | 100% | 100% | 100% |
| Product Viscosity [mm$^2$/s] | 305 | 315 | 310 | 314 | 316 | 318 |
| SiOH Content in the Product [mmol/100 g] | 44.3 | 51.1 | 51.0 | 50.8 | 51.0 | 50.9 |

What is claimed is:

1. A process for preparing organopolysiloxanes which bear triorganosiloxy groups, of the formula

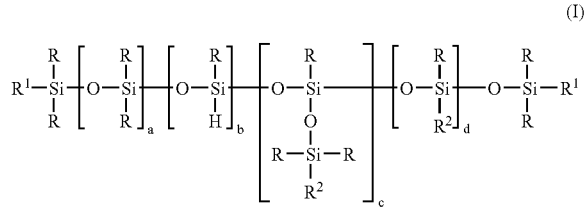

(I)

where R is a monovalent, SiC-bonded, optionally substituted hydrocarbon radical which is free of aliphatic carbon-carbon double bonds and has from 1 to 18 carbon atoms,
$R^1$ is R or $R^3$, and
$R^2$ is R or $R^3$, where
$R^3$ is a monovalent, SiC-bonded hydrocarbon radical having a terminal aliphatic carbon-carbon double bond and from 2 to 8 carbon atoms per radical,
a is an integer from 80 to 1000,
b is an integer from 0 to 100,
c is an integer from 1 to 100,
d is an integer from 0 to 100, by
(a) in a first step, reacting organopolysiloxane(s) (A) which have SiH groups and are of the formula

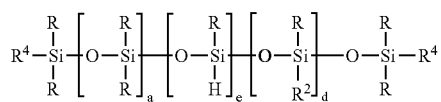

(II)

where
e is the sum of b+c and is an integer from 1 to 200,
$R^4$ is R or a hydrogen atom,
and R, a, b, c and d are each as defined above,
in the presence of at least one catalyst (B) selected from the group consisting of the metals of transition group VIII of the Periodic Table and compounds thereof,
and in the presence of at least one cocatalyst K selected from the group consisting of organic acids and low molecular weight organosilicon hydrides,
with water (C),
to provide intermediate(s) which have Si—OH groups and are of the formula

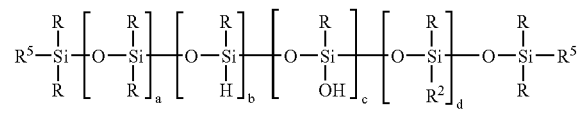

(III)

where
$R^5$ is R or an HO group,
and R, a, b, c and d are each as defined above,
and,
(b) in a second step,
reacting the intermediates which have SiOH groups with at least one silane (D) which has a group reactive with SiOH groups.

2. The process of claim 1, wherein e is an integer from 1 to 60.

3. The process of claim 1, wherein e is an integer from 1 to 16.

4. The process of claim 1, wherein $R^2$ is an alkenyl radical $R^3$ and b and d are each 0.

5. The process of claim 1, wherein at least one catalyst (B) bonded to a support material is present.

6. The process of claim 5, wherein the support material is selected from the group of $SiO_2$, $Al_2O_3$, aluminas, activated carbon, organic resins, and mixtures thereof.

7. The process of claim 1, wherein at least one catalyst (B) is selected from the group consisting of palladium, platinum, rhodium, ruthenium and iridium and their compounds.

8. The process of claim 1, wherein the catalyst (B) comprise palladium on activated carbon.

9. The process of claim 1, wherein at least one organopolysiloxane (A) having Si—H groups is one of the formulae

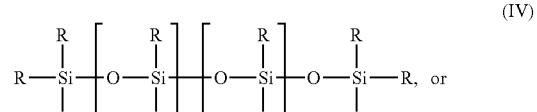

(IV)

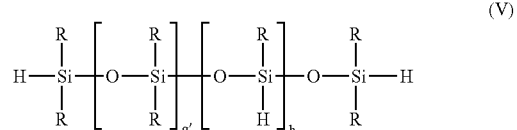

(V)

where
g is from 40 to 1000,
g' is from 38 to 1000,
h is from 1 to 6,
R is as defined in claim 1.

10. The process of claim 1, wherein at least one organopolysiloxane (A) having Si—H groups is one of the formulae

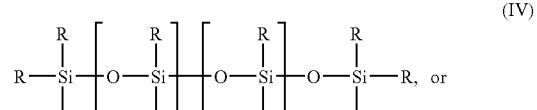

(IV)

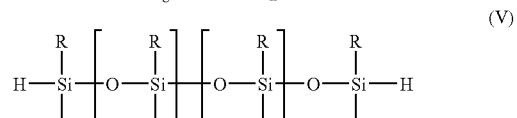

(V)

where
g is from 80 to 500,
g' is from 78 to 500,
h is from 2 to 4,
R is as defined in claim 1.

11. The process of claim 1, wherein at least one cocatalyst (K) is selected from the group consisting of organic acids and low molecular weight organosilicon hydrides containing from 1 to 5 silicon atoms.

12. The process claim 1, wherein at least one cocatalyst (K) is selected from the group consisting of formic acid, acetic acid, oxalic acid, citric acid, ascorbic acid, triethylsilane and tetramethyldisiloxane.

13. The process of claim 1, wherein the silanes (D) are selected from the group consisting of chlorosilanes, disilazanes, and mixtures thereof.

14. The process of claim 1, wherein the silanes (D) are selected from the group consisting of vinyldimethylchlorosilane, vinyldimethylethoxysilane, vinyldimethyldisilazane, and mixtures thereof.

15. The process of claim 1, wherein at least one organopolysiloxane (I) having triorganosiloxy groups has the formulae

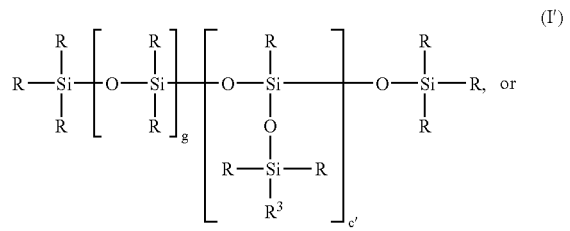

-continued

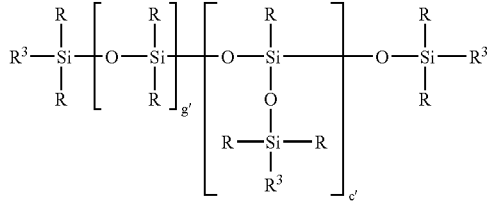

wherein
g is from 40 to 1000,
g' is from 38 to 1000, and
c' is from 1 to 6.

16. The process of claim 1, wherein the $R^3$ radical is a vinyl radical.

17. The process of claim 1, wherein the first and second process steps are carried out in the presence of at least one of solvents (E) and (G).

18. The process of claim 1, wherein at least one reaction promoting assistant (F) is present in the second process step.

19. The process of claim 18, wherein the reaction promoting assistant (F), comprises an alkali or alkaline earth metal salt of an inorganic or organic acid, an organic amine, a partial ester of phosphoric or phosphonic acid, or a transition metal of transition metal groups I to VII or compound thereof.

20. The process of claim 1, wherein, when the silanes (D) used in the second process step are chlorosilanes, organic amines are used as a reaction promoting assistant (F).

* * * * *